United States Patent [19]

Ikemoto et al.

[11] Patent Number: 4,750,597

[45] Date of Patent: Jun. 14, 1988

[54] GEAR SYNCHRONIZER MECHANISM IN POWER TRANSMISSION

[75] Inventors: Kazuhito Ikemoto; Yukio Terakura, both of Toyota, Japan

[73] Assignee: Toyota Jidosha Kabushiki Kaisha, Toyota, Japan

[21] Appl. No.: 833,029

[22] Filed: Feb. 26, 1986

[30] Foreign Application Priority Data

Feb. 26, 1985 [JP] Japan ............................ 60-26644[U]

[51] Int. Cl.[4] .................. F16D 11/00; F16H 3/38
[52] U.S. Cl. ..................................... 192/53 F; 74/339
[58] Field of Search ............. 74/339; 192/53 F, 53 A, 192/53 E

[56] References Cited

U.S. PATENT DOCUMENTS

| | | | |
|---|---|---|---|
| 2,175,857 | 10/1939 | Simpson | 192/53 F |
| 2,179,568 | 11/1939 | White | 192/53 F |
| 2,190,964 | 2/1940 | White | 192/53 R |
| 2,364,331 | 12/1944 | White | 192/53 F |
| 2,470,208 | 5/1949 | Avila | 192/53 F |
| 3,459,286 | 8/1969 | Cordiano | 74/339 |
| 4,132,122 | 1/1979 | Richards | 74/339 |
| 4,315,564 | 2/1982 | Numazawa et al. | 192/53 F |
| 4,376,475 | 3/1983 | Janiszewski | 74/339 |
| 4,445,602 | 5/1984 | Chana | 74/339 |
| 4,584,892 | 4/1986 | Hiraiwa | 74/339 |
| 4,625,844 | 12/1986 | Ikemoto et al. | 192/53 F |
| 4,674,614 | 6/1987 | Ikemoto et al. | 74/339 |

FOREIGN PATENT DOCUMENTS

| | | |
|---|---|---|
| 0144962A3 | 6/1985 | European Pat. Off. . |
| 2420206 | 11/1975 | Fed. Rep. of Germany .... 192/53 F |
| 2390633 | 12/1978 | France . |
| 55-100428 | 7/1980 | Japan . |
| 58-137627 | 8/1983 | Japan . |
| 58-163829 | 9/1983 | Japan . |
| 58-174724 | 10/1983 | Japan . |

*Primary Examiner*—Leslie A. Braun
*Assistant Examiner*—David Novais
*Attorney, Agent, or Firm*—Oblon, Fisher, Spivak, McClelland & Maier

[57] ABSTRACT

A gear synchronizer mechanism includes a gear member rotatable on a shaft, a hub member arranged adjacent the gear member and fixed to the shaft, and a clutch sleeve encircling an outer cylindrical portion of the hub member. The clutch sleeve is formed at its inner periphery with a plurality of circumferentially spaced radial projections axially movable in the corresponding axial grooves formed in the cylindrical portion of the hub member. A radially contractible C-letter shaped spring is supported in place by engagement with circumferentially spaced inner walls of the cylindrical portion of the hub member. The spring has an intermediate ring portion integrally formed with a plurality of circumferentially spaced axial legs extending therefrom toward the respective radial projections of the clutch sleeve, the axial legs each having a radial projection to be engaged with each of the radial projections of the clutch sleeve. The spring has a pair of end portions resiliently engaged with one of the inner walls of the cylindrical portion of the hub member to retain the axial legs in place within the respective axial grooves.

3 Claims, 3 Drawing Sheets

GEAR SYNCHRONIZER MECHANISM IN POWER TRANSMISSION

BACKGROUND OF THE INVENTION

1. Field of the Invention

The present invention relates to a gear synchronizer mechanism adapted for use in power transmissions, and more particularly to a gear synchronizer mechanism of the type which comprises a gear member rotatably mounted on a transmission shaft, a hub member arranged adjacent the gear member and fixed to the transmission shaft for rotation therewith, a spline piece mounted on a hub portion of the gear member for rotation therewith and being formed at one side thereof with a conical portion and thereon with external spline teeth, a synchronizer ring axially movably mounted on the conical portion of the spline piece for frictional engagement therewith, a clutch sleeve encircling the hub member and having internal spline teeth in continual engagement with external spline teeth of the hub member, the clutch sleeve being axially shiftable to be engaged at the internal spline teeth thereof with the external spline teeth of the spline piece, and a thrust mechanism for thrusting the synchronizer ring toward the spline piece in shifting operation of the clutch sleeve toward the gear member to effect the frictional engagement between the synchronizer ring and the spline piece.

2. Discussion of the Background

A conventional gear synchronizer mechanism as described above is well known as a Borg-Warner type synchronizer mechanism, in which the thrust mechanism comprises a plurality of circumferentially spaced strut keys each having a raised portion in engagement with the corresponding recess in the inner peripheral wall of the clutch sleeve, and an annular retainer spring arranged to bias the strut keys radially outwardly for engagement with the clutch sleeve. To reduce the component parts of the thrust mechanism, an improved thrust mechanism has been proposed in Japanese Early Patent Publications Nos. 55-100428, 58-137627, 58-163829, and 58-174724, wherein the strut keys and retainer spring are replaced with a single thrust element. It is, however, difficult to enhance productivity of the gear synchronizer mechanism at a low cost because the single thrust element is complicated in its configuration and construction.

To overcome the shortcomings of such a conventional thrust mechanism as described above, an improved gear synchronizer mechanism has been proposed by the inventors in copending U.S. patent application Ser. No. 791,947, filed on Oct. 28, 1985, now U.S. Pat. No. 4,674,614, wherein the clutch sleeve is formed at its inner periphery with circumferentially equi-spaced three internal radial projections which are disposed within circumferentially equi-spaced three axial grooves formed in an outer cylindrical portion of the hub member, and wherein the thrust mechanism comprises a radially contractible C-letter shaped spring supported in place by engagement with circumferentially spaced inner walls of the outer cylindrical portion of the hub member, the C-letter shaped spring being formed at opposite ends thereof with a pair of circumferentially spaced axial legs and at an intermediate portion thereof with an axial leg, the axial legs each extending from the spring toward the respective internal radial projections of the clutch sleeve and having a radial projection arranged to be brought into engagement with each of the internal radial projections of the clutch sleeve and arranged to abut against the syhchronizer ring and thrust the same toward the spline piece.

In the above-described synchronizer mechanism, however, the pair of circumferentially spaced axial legs of the C-letter shaped spring each are located within the corresponding axial groove formed in the outer cylindrical portion of the hub member. In this arrangement, the opposite ends of the C-letter shaped spring are free to move radially inwardly in the respective axial grooves and tend to remain in their displaced positions. If the axial legs of the spring may not be retained in their correct positions for engagement with the internal radial projections of the clutch sleeve, insufficient balk action of the synchronizer ring will cause undesired gear noises in shifting operation of the clutch sleeve toward the gear member.

SUMMARY OF THE INVENTION

It is, therefore, a primary object of the present invention to provide an improved gear synchronizer mechanism capable of retaining the axial legs of the C-letter shaped spring in their correct positions for engagement with the internal radial projections of the clutch sleeve.

According to the present invention briefly summarized, there is provided a gear synchronizer mechanism wherein the clutch sleeve is formed at its inner periphery with a plurality of circumferentially spaced internal radial projections axially movable in the corresponding axial grooves formed in the outer cylindrical portion of the hub member, and wherein the thrust mechanism comprises a radially contractible annular resilient member supported in place by engagement with circumferentially spaced inner walls of the cylindrical portion of the hub member, the annular resilient member having an intermediate ring portion integrally formed with a plurality of circumferentially spaced axial legs extending therefrom toward the respective internal radial projections of the clutch sleeve, the axial legs each being arranged within the respective axial grooves in the cylindrical portion of the hub member and having a radial projection arranged to be brought into engagement with each of the internal radial projections of the clutch sleeve in shifting operation of the clutch sleeve toward the gear member and arranged to abut against the synchronizer ring and thrust the same toward the spline piece. In such arrangement of the gear synchronizer mechanism, the annular resilient member has a pair of end portions resiliently engaged with one of the circumferentially spaced inner walls of the cylindrical portion of the hub member to retain the axial legs in place within the respective axial grooves in the cylindrical portion of the hub member.

BRIEF DESCRIPTION OF THE DRAWINGS

Additional objects, features and advantages of the present invention will become more readily apparent from the following detailed description of a preferred embodiment thereof when considered with reference to the attached drawings in which.

DESCRIPTION OF THE PREFERRED EMBODIMENT

Figure 1:
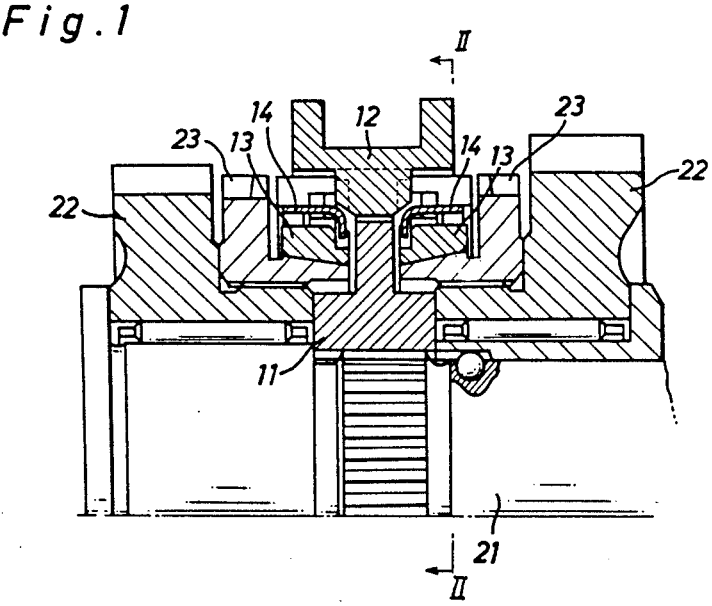
FIG. 1 illustrates in cross-sectional form one of circumferentially equi-spaced parts of a gear synchronizer mechanism in accordance with the present invention.
Figure 2:
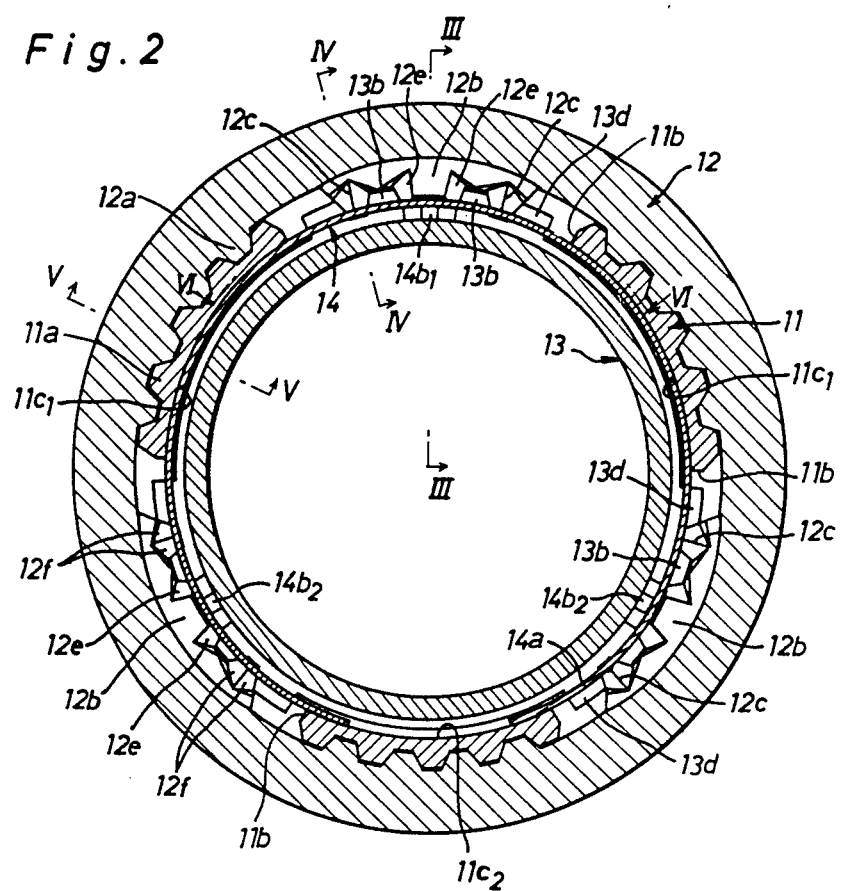
FIG. 2 is a cross-sectional view taken along line II—II in FIG. 1.
Figure 5:
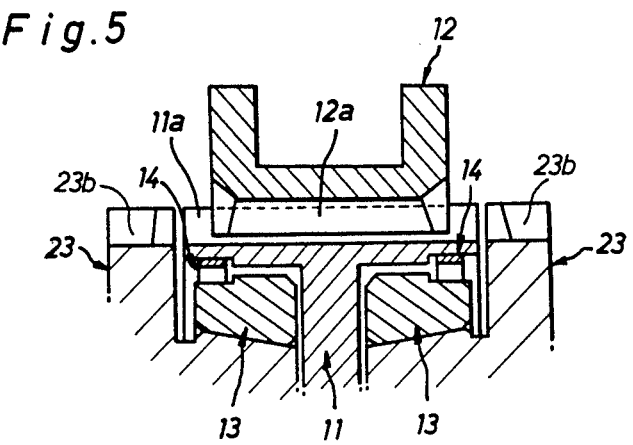
FIG. 5 is an enlarged cross-sectional view taken along line V—V in FIG. 2.

Referring now to the drawings, where like reference numerals represent the same or corresponding parts throughout the figures, there is illustrated in FIG. 1 a transmission shaft 21, on which are rotatably supported a pair of change-speed gears 22 and 22. Disposed between the change-speed gears 22 and 22 is a pair of synchronizer assemblies which are operable to cause selective speed synchronization between the shaft 21 and the gears 22 and 22, respectively. As is illustrated in FIGS. 1 and 2, the synchronizer assemblies have a common hub assembly which includes a hub member 11 fixed at its inner hub portion to the transmission shaft 21 by means of a spline connection for rotation therewith. The synchronizer assemblies are arranged to be operated through a clutch sleeve 12 which is connected by a yoke groove to a conventional manually operated shift mechanism (not shown). As shown in FIGS. 2 and 5, the hub member 11 is integrally formed with an outer cylindrical hub portion which is formed thereon with external spline teeth 11a. The clutch sleeve 12 is arranged in surrounding relationship with the outer cylindrical hub portion of hub member 11 and has internal spline teeth 12a in continual engagement with the external spline teeth 11a of hub member 11. The clutch sleeve 12 is axially shiftable to be engaged at its internal spline teeth 12a with external spline teeth 23b of a spline piece 23.

The left-hand synchronizer assembly is substantially the same as the right-hand synchronizer assembly such that a detailed description of the right-hand synchronizer assembly only is believed necessary. The right-hand synchronizer assembly includes a synchronizer ring 13, a radially contractible annular resilient member in the form of a C-letter shaped spring 14, and the spline piece 23 which are arranged between the hub member 11 and the gear 22. The spline piece 23 is fixedly mounted on a hub portion of change-speed gear 22 by means of a spline connection for rotation therewith. The spline piece 23 is formed at its left end with a conical portion 23a and thereon with the external spline teeth 23b which are chamfered at each end thereof. The synchronizer ring 13 is rotatably and axially slidably mounted on the conical portion 23a of spline piece 23 and has an internal conical surface 13a for frictional engagement with the surface of the conical portion 23a of spline piece 23. Thus, the synchronizer ring 13 cooperates with the spline piece 23 to provide a friction clutch in a well-known manner.

Figure 3:
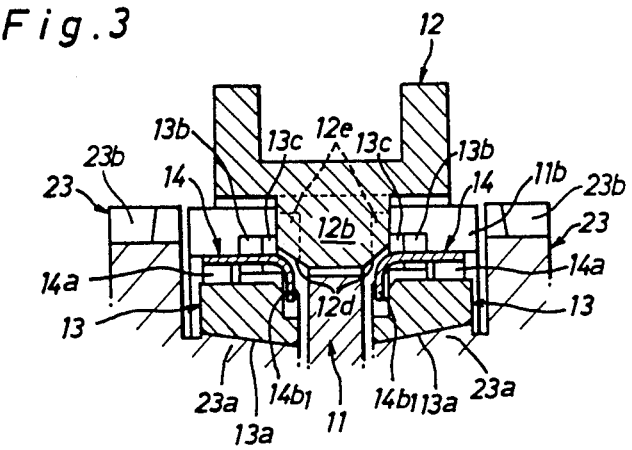
FIG. 3 is an enlarged cross-sectional view taken along line III—III in FIG. 2.
Figure 4:
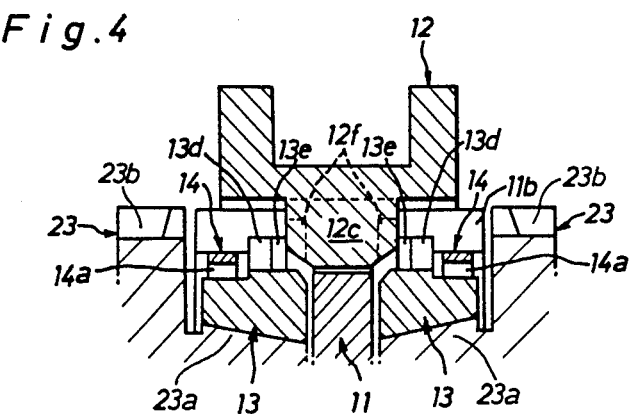
FIG. 4 is an enlarged cross-sectional view taken along line IV—IV in FIG. 2.

In this embodiment, the outer cylindrical hub portion of hub member 11 is axially recessed in its circumferentially equi-spaced three portions. As shown in FIGS. 2, 3 and 4, the axially recessed portions each are formed as an axial groove 11b. The clutch sleeve 12 is formed at its inner periphery with circumferentially equi-spaced three internal radial projections 12b of large width which are axially shiftable in the axial grooves 11b of hub member 11. The clutch sleeve 12 is further formed at its inner periphery with a pair of internal radial projections 12c of small width which are arranged at opposite sides of the respective large width radial projections 12b.

Figures 6, 7:
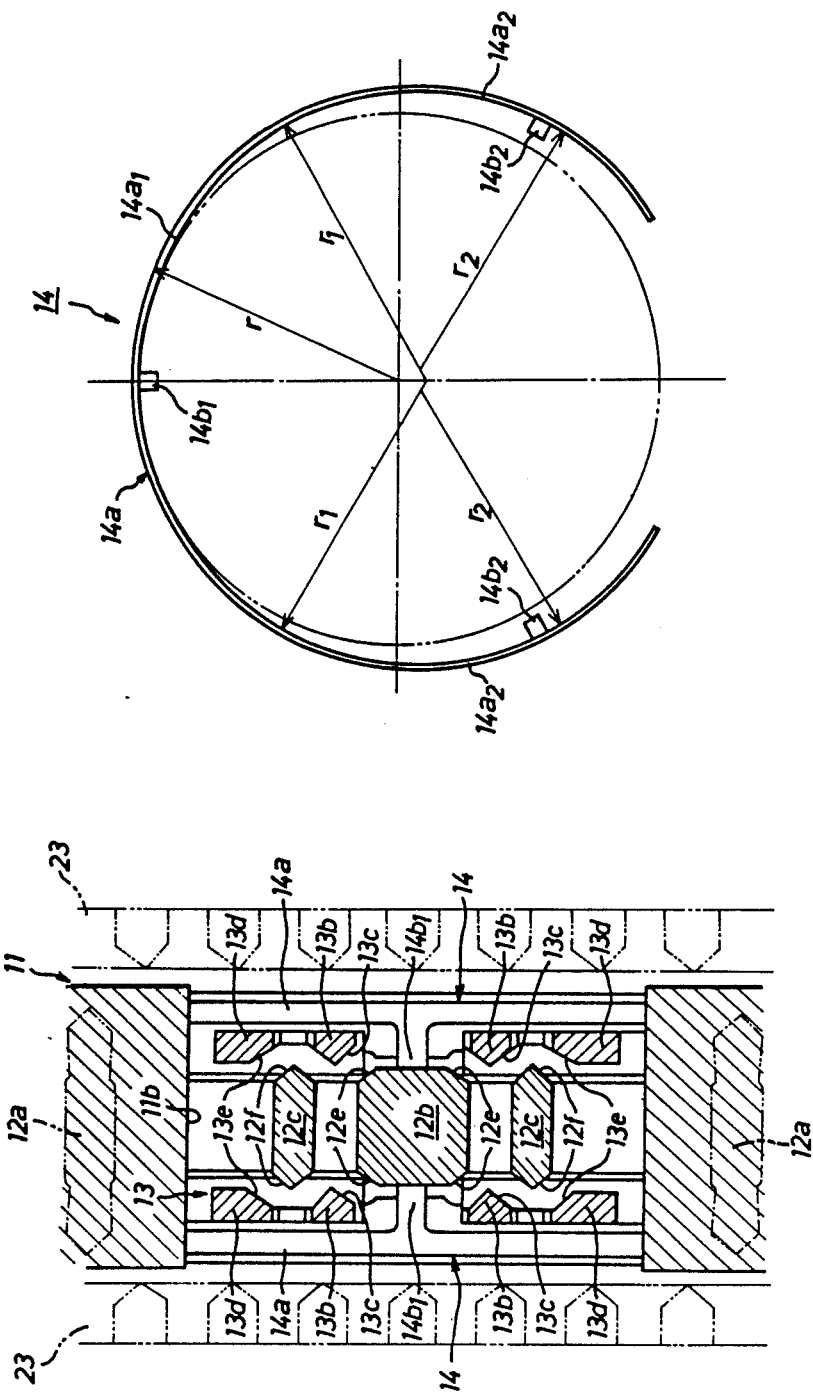
FIG. 6 is an enlarged partial view taken along line VI—VI in FIG. 2, showing the relative positions of a clutch sleeve, a synchronizer ring and a spline piece illustrated in FIGS. 1 to 5.
FIG. 7 is a front view of a C-letter shaped spring shown in FIG. 2.

As shown in FIGS. 3 and 6, the large width radial projections 12b each are formed at their inner end corners with tapered surfaces 12d and at their side corners with chamfers 12e. The large width radial projections 12b are respectively arranged between a pair of circumferentially equi-spaced raised portions 13b which are integrally formed on the synchronizer ring 13. The raised portions 13b of synchronizer ring 13 each are formed at their inner ends with a pair of chamfers 13c which are engageable with the chamfers 12e of large width radial projections 12b, respectively. As shown in FIGS. 4 and 6, the small width radial projections 12c each are formed at their opposite ends with chamfers 12f and are arranged between the raised portion 13b and another raised portion 13d formed on the synchronizer ring 13 adjacent the respective raised portions 13b. The raised portions 13d of synchronizer ring 13 each are formed at their inner ends with a chamfer 13e which is engageable with the chamfer 12f of small width radial projection 12c.

As shown in FIGS. 2 and 7, the radially contractible C-letter shaped spring 14 includes a C-letter shaped ring portion 14a which is formed at its intermediate portion with circumferentially equi-spaced three axial legs $14b_1$ and $14b_2$. The ring portion 14a of spring 14 has radiuses $r_1$ and $r_2$ of curvature larger than an internal diameter r of the outer cylindrical hub portion of hub member 11. In this embodiment, the radius $r_1$ of curvature at a central part $14a_1$ of ring portion 14a is determined to be larger than the radius $r_2$ of curvature at each side part $14a_2$ of ring portion 14a. With such a configuration, the ring portion 14a of spring 14 is supported in place by engagement with circumferentially spaced inner walls $11c_1$ and $11c_2$ of the outer cylindrical hub portion of hub member 11 in the presence of a radial force imposed thereto. The axial leg $14b_1$ is positioned substantially at the center of central ring part $14a_1$, and the axial legs $14b_2$ each are positioned substantially at the center of side ring part $14a_2$. The axial legs $14b_1$ and $14b_2$ of spring 14 each extend from the ring portion 14a toward the internal radial projection 12b of clutch sleeve 12 through an axial groove between the raised portions 13b and 13b of synchronizer ring 13. The axial legs $14b_1$ and $14b_2$ of spring 14 each are formed with a radial projection which is arranged between the inner end surface of synchronizer ring 13 and the tapered surface 12d of the internal radial projection 12b of clutch sleeve 12.

In shifting operation of the clutch sleeve 12 toward the spline piece 23, the axial legs $14b_1$ and $14b_2$ of spring 14 are slightly moved in an axial direction by engagement with the tapered surfaces 12d of large width radial projections 12b at their inner shoulders such that each radial projection of axial legs 14b abuts against the synchronizer ring 13 and thrusts the same toward the spline piece 23 which will effect frictional engagement of the internal conical surface 13a of synchronizer ring 13 and the surface of the conical portion 23a of spline piece 23. Simultaneously, the axial movement of clutch sleeve 12 will be resisted by balk action or engagement between the chamfers 12e, 12f of large and small width radial projections 12b and 12c and the chamfers 13c, 13e of raised portions 13b and 13d. When the thrust pressure acting on spring 14 exceeds a predetermined value, synchronization between the relatively rotating parts is established, and the large width radial projections 12b of clutch sleeve 12 ride over the axial legs 14$b_1$, 14$b_2$ of spring 14 to compress them radially inwardly. This permits the radial projections 12b, 12c of clutch sleeve 12 to pass through axial grooves respectively formed between the raised portions 13b and 13d of synchronizer ring 13. Thus, the internal splines 12a of clutch sleeve 12 will be brought into engagement with the external spline teeth 23b of spline piece 23 to effect synchronous connection between the transmission shaft 21 and the gear 22.

As is understood from the above description, the gear synchronizer mechanism is characterized in that the large width radial projections 12b of clutch sleeve 12 are arranged to thrust the C-letter shaped spring 14 for effecting frictional engagement of the synchronizer ring 13 with the spline piece 23. This is useful to simplify the gear synchronizer mechanism in construction so as to enhance productivity of the same at a low cost. The gear synchronizer mechanism is further characterized in that the small width radial projections 12c of clutch sleeve 12 are arranged to be engaged at their chamfered ends 12f with the chamfers 13c, 13e of raised portions 13b and 13d of synchronizer ring 13. In this arrangement, it is advantageous that even if the number of the large width radial projections 12b is reduced to form a sufficient number of internal spline teeth 12a on the clutch sleeve 12 for reliable torque transmission, the small width radial projections 12c will be useful to increase the number of intermeshed portions between the clutch sleeve 12 and the synchronizer ring 13.

In the gear synchronizer mechanism, it is further noted that as shown in FIG. 2, the ring portion 14a of spring 14 is supported in place by engagement with the circumferentially spaced inner walls 11$c_1$ of hub member 11 at its central part 14$a_1$ and engagement with the inner wall 11$c_2$ of hub member 11 at its side parts 14$a_2$. This is useful to retain the respective axial legs 14$b_1$ and 14$b_2$ of spring 14 in their correct positions for engagement with the large width radial projections 12b of clutch sleeve 12. With such an arrangement of the C-letter shaped spring 14, the respective large width radial projections 12b of clutch sleeve 12 are simultaneously engaged at their tapered surfaces 12d with the respective axial legs 14$b_1$, 14$b_2$ of spring 14 in shifting operation thereby to thrust the synchronizer ring 13 toward the spline piece 23 for effecting frictional engagement of the internal conical surface 13a of synchronizer ring 13 and the conical portion 23a of spline piece 23. Thus, the occurrence of gear noises caused by insufficient balk action of the synchronizer ring 13 can be avoided in a reliable manner. Furthermore, the C-letter shaped spring 14 is formed in such a manner that each radius $r_2$ of curvature at the side parts 14$a_2$ is smaller than the radius $r_1$ of curvature at the central part 14$a_1$. This is useful to engage the whole ring portion 14a of spring 14 with the circumferentially spaced inner walls 11$c_1$ and 11$c_2$ of hub member 11 so as to retain the axial legs 14$b_1$, 14$b_2$ of spring 14 in their correct positions in a more reliable manner.

Having now fully set forth both structure and operation of a preferred embodiment of the concept underlying the present invention, various other embodiments as well as certain variations and modifications of the embodiment herein shown and described will obviously occur to those skilled in the art upon becoming familiar with the underlying concept. It is to be understood, therefore, that within the scope of the appended claims, the invention may be practiced otherwise than as specifically set forth herein.

What is claimed is:

1. A gear synchronizer mechanism comprising a gear member rotatable on a transmission shaft, a spline piece mounted on a hub portion of said gear member for rotation therewith and being formed at one side thereof with a conical portion and thereon with external spline teeth, a synchronizer ring axially movable on the conical portion of said spline piece for frictional engagement therewith, a hub member arranged adjacent said gear member and fixed to said shaft for rotation therewith, said hub member having a cylindrical portion encircling said synchronizer ring and being formed thereon with external spline teeth, a clutch sleeve encircling the cylindrical portion of said hub member and having internal spline teeth in continual engagement with the external spline teeth of said hub member, said clutch sleeve being axially shiftable to be engaged at the internal spline teeth thereof with the external spline teeth of said spline piece, and thrust means for thrusting said synchronizer ring toward said spline piece in shifting operation of said clutch sleeve toward said gear member to effect the frictional engagement of said synchronizer ring with the conical portion of said spline piece, wherein said clutch sleeve is formed at its inner periphery with a plurality of circumferentially spaced internal radial projections axially movable in corresponding axial grooves formed in the cylindrical portion of said hub member, and wherein said thrust means comprises a radially contractible annular resilient member supported in place by engagement with circumferentially spaced inner walls of the cylindrical portion of said hub member, said resilient member having an intermediate ring portion integrally formed with a plurality of circumferentially spaced axial legs extending therefrom toward the respective internal radial projections of said clutch sleeve, said axial legs each being arranged within the respective axial grooves in the cylindrical portion of said hub member and having a radial projection arranged to be brought into engagement with each of the internal radial projections of said clutch sleeve in shifting operation of said clutch sleeve toward said gear member and arranged to abut against said synchronizer ring and thrust the same toward said spline piece, said annular resilient member having a pair of end portions resiliently engaged with one of the circumferentially spaced inner walls of the cylindrical portion of said hub member to retain said axial legs in place within the respective axial grooves in the cylindrical portion of said hub member.

2. A gear synchronizer mechanism as claimed in claim 1, wherein said annular resilient member is in the form of a C-letter shaped spring having an intermediate ring portion resiliently engaged with the circumferentially spaced inner walls of the cylindrical portion of said hub member and a pair of end portions resiliently engaged with one of the inner walls of the cylindrical portion of said hub member, said intermediate portion of said spring being integrally formed with a plurality of circumferentially spaced axial legs extending therefrom toward the respective internal radial projections of said clutch sleeve, said axial legs each being arranged within the respective axial grooves in the cylindrical portion of said hub member and having a radial projection arranged to be brought into engagement with each of the internal radial projections of said clutch sleeve in shifting operation of said clutch sleeve toward said gear member and arranged to abut against said synchronizer ring and thrust the same toward said spline piece.

3. A gear synchronizer mechanism as claimed in claim 1, wherein the internal radial projections of said clutch sleeve each are formed at their inner ends with a tapered surface engageable with each inner shoulder of said axial legs of said annular resilient member.

* * * * *